United States Patent [19]
Ryan

[11] Patent Number: 5,622,032
[45] Date of Patent: Apr. 22, 1997

[54] PACKAGING MACHINE

[76] Inventor: Alfred A. Ryan, Unit 17, 10 Ferngrove Place, Chester Hill, New South Wales 2162, Australia

[21] Appl. No.: 384,853
[22] Filed: Feb. 7, 1995
[30] Foreign Application Priority Data Feb. 8, 1994 [AU] Australia .................... PM3746

[51] Int. Cl.$^6$ .................................................. B65B 9/06
[52] U.S. Cl. ............................................ 53/551; 53/374.9
[58] Field of Search ................................ 53/552, 373.2, 53/373.7, 284.7, 374.8, 374.9, 375.6, 526, 551

[56] References Cited

U.S. PATENT DOCUMENTS

| | | | |
|---|---|---|---|
| 4,328,654 | 5/1982 | Van Ginkel et al. | 53/373.2 |
| 4,663,917 | 5/1987 | Taylor | 53/552 |
| 4,751,808 | 6/1988 | Hadden | 53/374.8 |
| 4,996,825 | 3/1991 | Bacon et al. | 53/374.8 |
| 5,062,253 | 11/1991 | Bacon et al. | 53/374.8 |

FOREIGN PATENT DOCUMENTS 0182505  10/1985  European Pat. Off.

Primary Examiner—John Sipos
Assistant Examiner—Gene L. Kim
Attorney, Agent, or Firm—Ladas & Parry

[57] ABSTRACT

A rotary packaging machine including a pair of cooperating stripper bars (17) which engage the bag material (15) prior to the sealing jaws (16) engaging the bag material (15). The stripper bars (17) have attached to them or formed integral therewith, bag shields (30). The bag shields (30) are arcuate so as to generally extend along an arcuate path having a fixed axis extending from the pivot axis (32) of the supporting lever (26) for the stripper bar (17).

10 Claims, 5 Drawing Sheets

5,622,032

PACKAGING MACHINE

TECHNICAL FIELD

The present invention relates to packaging machines and more particularly to packaging machines employing "strippers".

BACKGROUND OF THE INVENTION

The present invention relates to packaging machines, such as the packaging machines described in U.S. Pat. No. 4,663,917. The machine disclosed in this particular USA patent has cooperating stripper bars which remove product from the "seal area" and strip the packaging material in order to reduce the volume occupied by the product being packaged. Also closer bars are employed so that there is a length of package within which there is no product, and which is engaged by the sealing jaws. The stripper bars are mounted on rotatably driven arms, with the arms rotating in opposite directions about parallel transversely spaced axes. Both arms rotate "continuously" in their respective angular directions.

The above discussed stripper bars move along the bag material to remove any product which may be located in the area to be engaged by the sealing jaws. However it is a disadvantage of the stripper bars that there is extending from them flanges which engage the bag material to ensure that apart from the stripped length of bag material, the bag material does not engage the sealing jaws. These previously known stripper bars and associated shields or flanges suffer the disadvantage that they further reduce the volume available for the product.

OBJECT OF THE INVENTION

It is the object of the present invention to overcome or substantially ameliorate the above disadvantages.

SUMMARY OF THE INVENTION

There is disclosed herein a stripper member for a stripping and sealing assembly of a packaging machine, said stripper member comprising:

a pair of spaced stripper levers with each lever having a first end, the first ends providing for pivot movement of the stripper member about a pivot axis each lever further having a second end remote from the associated first end;

a stripper bar extending between the second ends; and an arcuate bag shield formed integral with or attached to the stripper bar, said shield extending from said stripper bar and having an outer surface radially spaced from said axis by a substantially fixed radius, and an inner surface conforming substantially to said outer surface.

There is further disclosed herein a stripping and sealing assembly, for a rotary packaging apparatus, said apparatus including a product delivery head and a drive assembly to move the bag material past said delivery head so that product delivered from said head is located within said tubular bag material, said stripping and sealing assembly including a pair of opposing sealing and stripping means to be located on opposite sides of said bag material at a position downstream from said delivery head in the direction of movement of said bag material through said apparatus, said sealing and stripping means being adapted to cooperate to sealingly close portions of said bag material and strip same prior to sealing, a first arm means supporting one of said sealing and stripping means and a second arm first arm means supporting one of said sealing and stripping means and a second arm means supporting the other sealing and stripping means, a pair of generally parallel rotatably driven shafts, from each of which there extends radially outwardly therefrom a respective one of the arm means, each sealing and stripping means including a a sealing jaw and a stripper bar, with the stripper bars cooperating to strip the bag material prior to the jaws sealingly engaging the bag material, and wherein the arm means via said shafts are rotatably driven continuously through complete revolutions in synchronism on opposite directions about spaced parallel stationary axes extending generally transverse of the direction of movement of the bag material so that prior to sealing said bag material the stripping and sealing means are moved along said bag material to cause the stripper bars to strip same, and wherein the assembly further includes a support for each stripper bar pivotally mounting the stripper bar on its supporting arm means so as to provide for relative movement therebetween about a pivot axis, with said assembly further including a pair of bag shields, each bag shield being fixed to or formed integral with a respective one of the stripper bars and extending angularly therefrom generally along an arc having a radius extending from the pivot axis of the associated support, with the shields extending away from each other in opposite directions from their respective stripper bars, when the stripper bars are engaged with the bag material.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
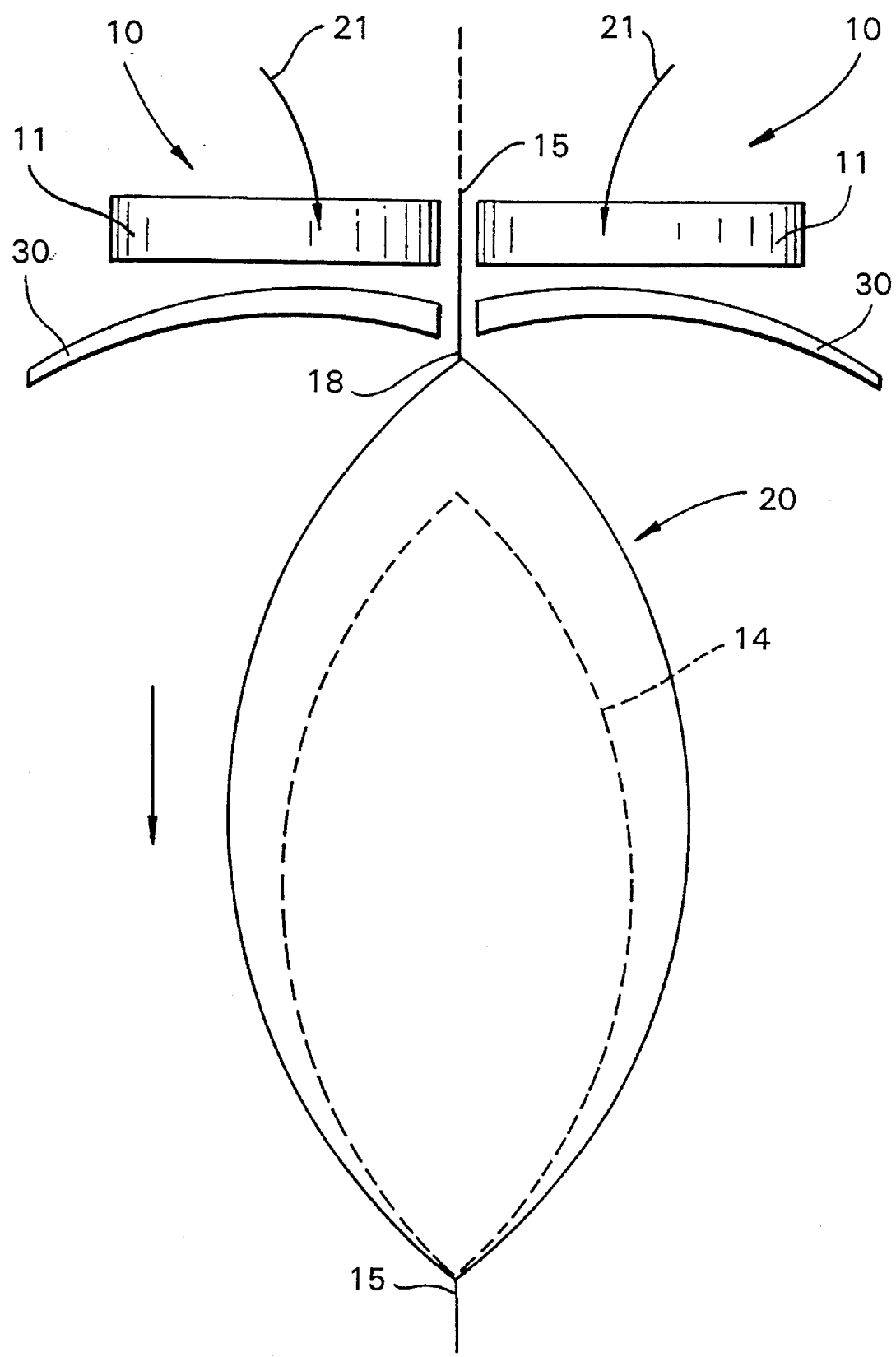
FIG. 1 is a schematic side elevation of a portion of bag material being stripped, sealed and cut.

In the accompanying drawings there is schematically depicted the portion 10 of a packaging machine. The packaging machine is a rotary machine in that it has a pair of arms 11 which rotate about transversely spaced parallel axes 12 defined by spaced parallel shafts 13. The machine may be constructed in accordance with U.S. Pat. No. 4,663,917. The shafts 13 are stationary in respect of their positions in the machine, but they rotate continuously in opposite angular directions repeatedly through 360°. The packaging machine has a product delivery head which delivers product 14 to the interior of tubular bag material 15. The bag material 15 is driven, by, for example, the machine shown in U.S. Pat. No. 4,910,943. The machine strips and closes the bag material as well as seals the bag material and cuts each bag from the tubular material as it is formed. The sequence of operations is as follows. Firstly, the tubular bag material 15 is driven past a product delivery head so that product 14 is delivered to the interior of the tubular bag material 15. Thereafter, a pair of cooperating stripper bars 17 (one on each side of the tubular bag material 15) move down the tubular bag material so as to reduce the volume occupied by the product 14. A length of tubular bag material 18 is then ready to be engaged by the sealing jaws 16. However a pair of tube closer bars 19 located above the stripper bars 17 engage the tubular bag material 15 to prevent further product coming down the tubular bag material 15 to the tubular length 18. The sealing jaws 16 engage the length 18 in between the stripper bars 17 and closer bars 19. Preferably one of the sealing jaw 16 would be provided with a knife so as to cut discrete lengths of bag material 15 to provide a complete bag 20.

It should be appreciated that each portion 10 includes an arm 11 as well as a stripper bar 17 and a closer bar 19. The portions 10 are located on opposite sides of the tubular bag material and cooperate to form discrete bags 20.

The following description will be in respect of a single portion 10 only.

The shaft 13 of the portion 10 is driven in the direction of the arrow Mounted on the arm 11 is a pair of levers 22 of which only one is illustrated. The levers 22 are spaced in the direction of the axis 12 and support between them the stripper bars 17 and closer bars 19.

Each lever 22 is attached to its associated arm 11 by a pivot pin 32. In this regard it should be appreciated that each arm 11 consists of two projections 21 which extend radially from the shaft 13. The projections 24 are spaced longitudinally of the shaft 13 and have the sealing jaw 16 extending therebetween. The sealing jaw 16 has a heated sealing element 25. Each lever 22 is fixed to an associated one of the projections 24.

Pivotally mounted on each lever 22 is a stripper lever 26 with each stripper bar 17 extending between the associated pair of levers 26. The associated stripper levers 26 are generally parallel and co-extensive. Also pivotally mounted on each lever 22 is a closer lever 27, with the closer bar 19 extending between the associated pair of levers 27. The levers 26 are spring biased to move in the direction of the arrow 28 while the levers 27 are spring biased to move in the direction of the arrow 29.

In this embodiment, the stripper bar 17 is integrally formed with or has fixed to it a bag shield 30. The bag shield 30 is arcuate and extends the length of the stripper bar 17 so as to extend across the bag material 15. The shield 30 has an arcuate convey outer surface 31 which extends angularly at a substantially fixed radius about the axis 32 about which the lever 26 pivots. Preferably the inner concave surface 35 of the shield 30 closely conforms to the configuration of the surface 31 so that the shield 30 generally follows an arc having its radius extending from the axis 32. The surface 31 has its radius extending from the axis 32 so that the stripper bar 17 can engage the bag material 15 as close to the sealing jaws 16 as possible. By having the surface 31 curved with a generally fixed radius extending from the axis 32, movement of the sealing jaws 16 toward and away from the bag material 15 will not result in unwanted contact between the shield 30 and the sealing jaws 16. Still further, by having the shield 30 shaped as discussed above, the bag 20 is permitted to assume a shape which maximizes the volume available to the product 14 yet ensuring that there is sufficient length 18 for the sealing jaws 16 to properly engage the bag material 15.

Figure 2:
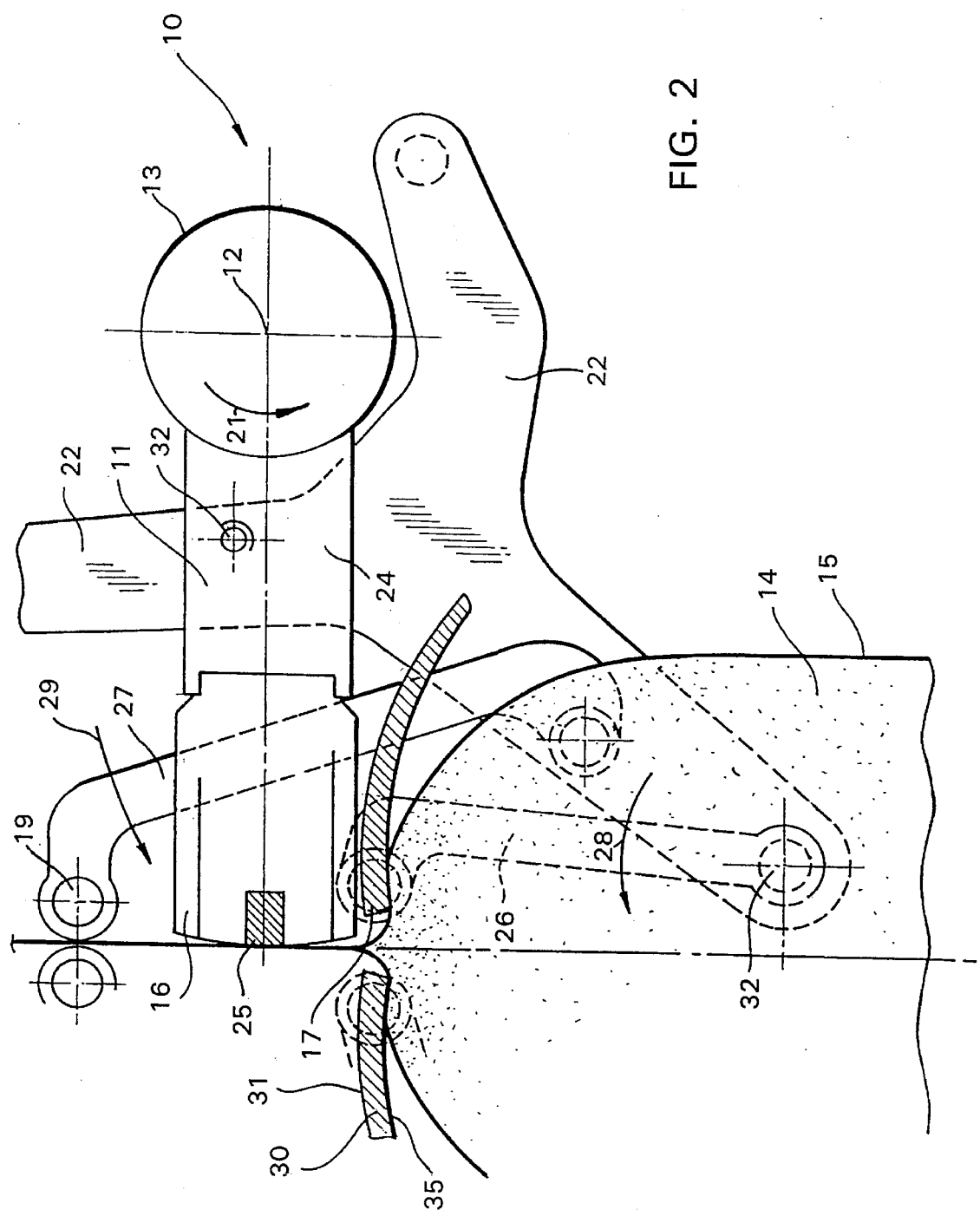
FIG. 2 is a schematic side elevation of a portion of the packaging machine performing the function schematically depicted in FIG. 1.
Figure 3:
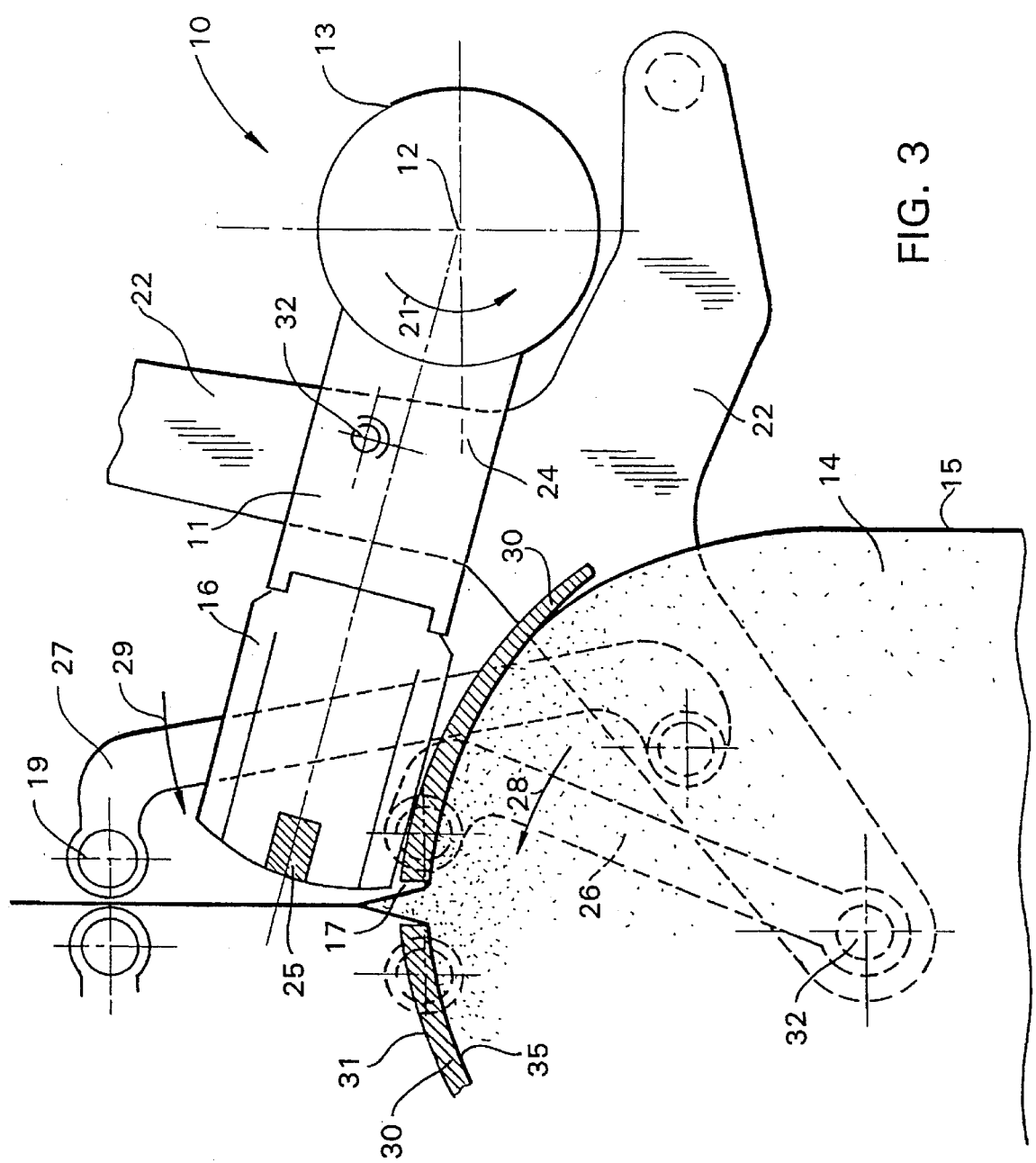
FIG. 3 is a schematic side elevation of the packaging machine portion illustrated in FIG. 2.

It should be appreciated that in FIG. 2, the sealing jaws 16 are depicted at the position in which the jaws 16 are sealing the bag material and cutting the material 15. In FIG. 3, the sealing jaws 16 are depicted at 15 prior to the position depicted in FIG. 2.

Figure 4:
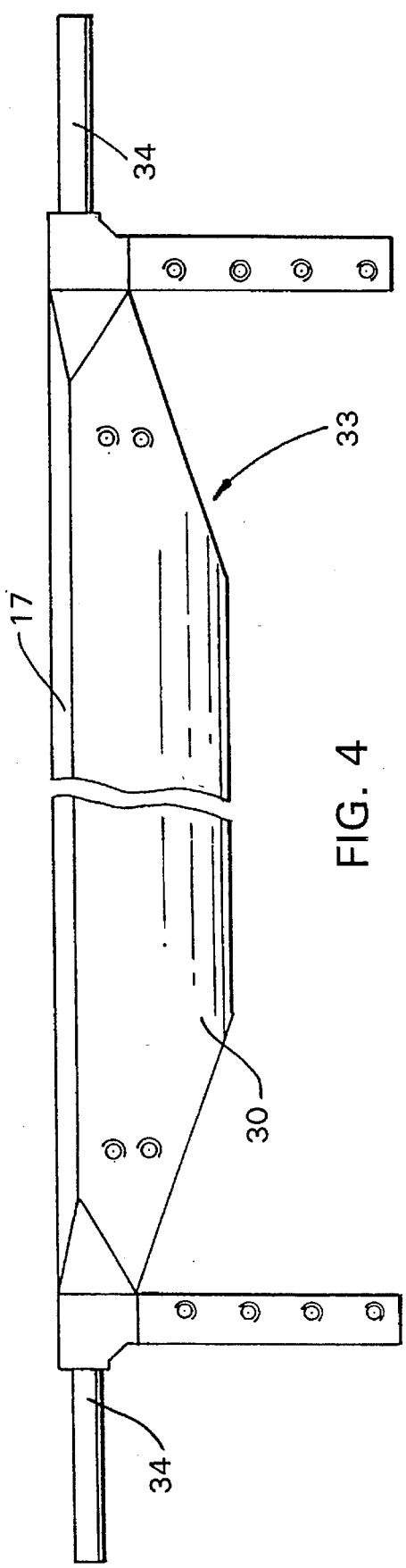
FIG. 4 is a schematic front elevation of the stripper bar and bag shield of FIGS. 1, 2 and 3.
Figure 5:
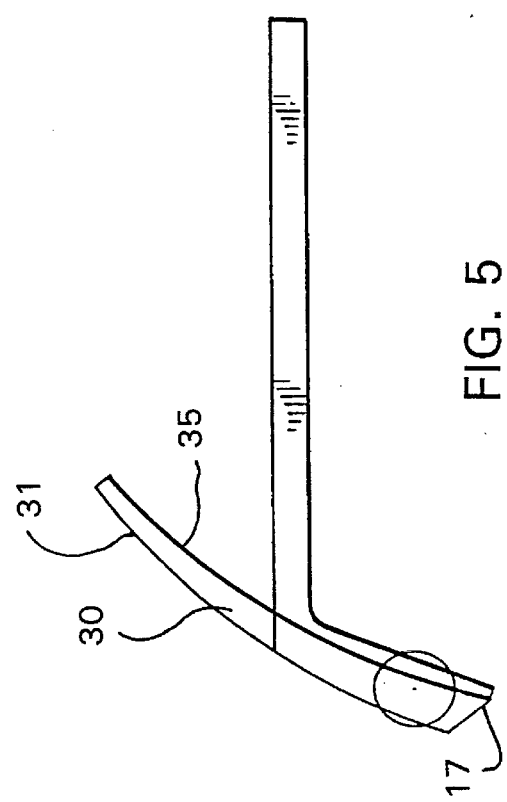
FIG. 5 is a schematic side elevation of the stripper bar and bag shield shown in FIG. 4.
Figure 6:
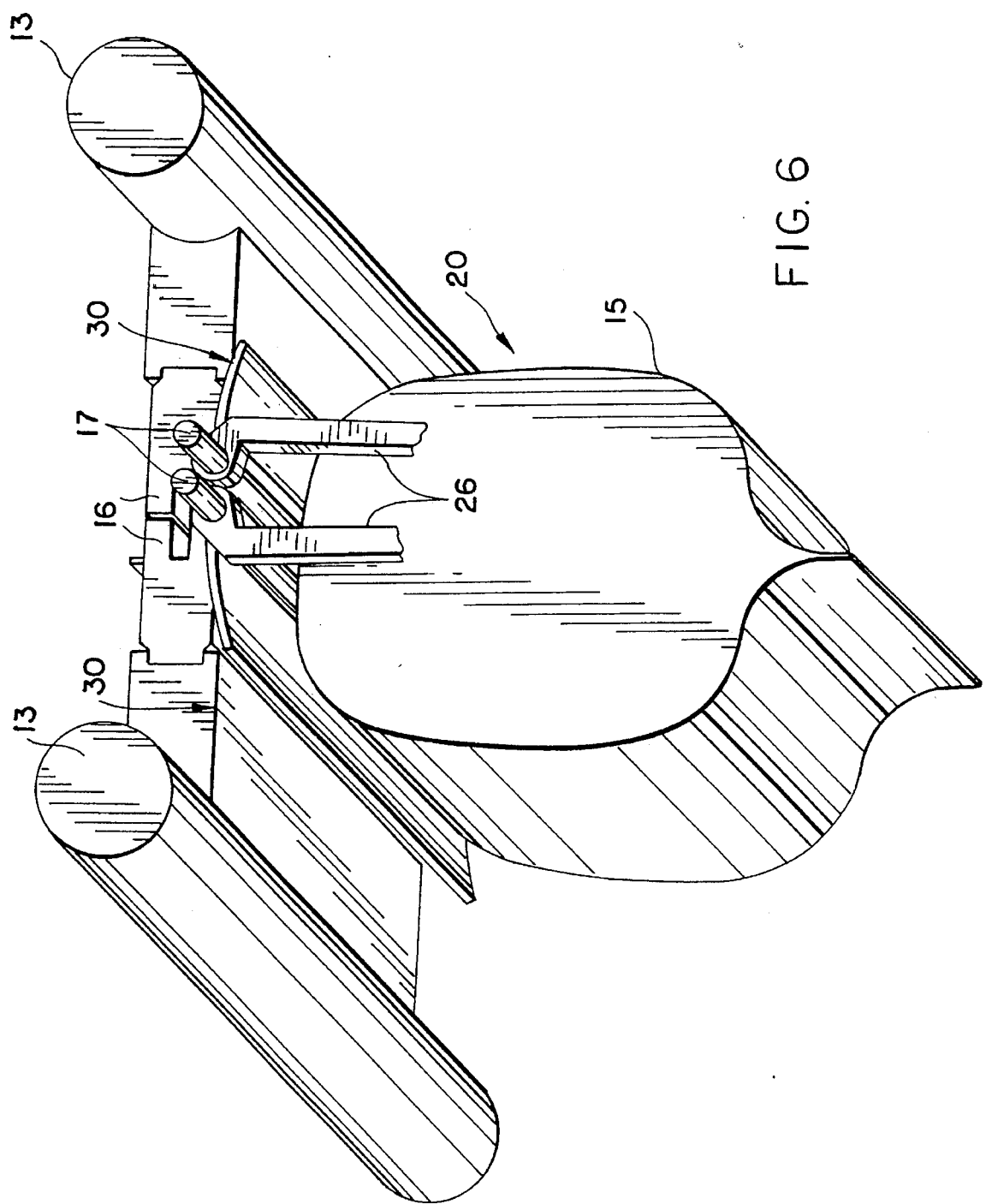
FIG. 6 is a simplified, schematic, perspective, view of the portion of the packaging machine shown in FIGS. 2 and 3.

The above mentioned stripper bar 17 and bag shield 30 are more fully depicted in FIGS. 4 and 5. In the present instance the stripper bar 17 and bag shield 30 are integrally formed to provide a stripper member 33. The stripper member 33 has a leading portion providing the stripper bar 17 from which there rearwardly extends and integrally formed therewith is the bag shield 30. Extending laterally are two shafts 34 which enable the stripper member 33 to be pivotally attached to the extremities of the levers 26.

What I claim is:

1. In a rotary packaging machine having a stripping and sealing assembly for stripping and sealing tubular bag material containing a product, the improvement comprising a stripper member adapted to be attached to said stripping and sealing assembly, said stripper member comprising:

a pair of spaced stripper levers, each lever having a first end, the first end of each lever providing for pivot movement of the stripper member about a pivot axis, each lever further having a second end remote from the associated first end;

a stripper bar extending between the second ends of the pair of stripper levers; and an arcuate bag shield secured to the stripper bar, said shield extending from said stripper bar and having an outer convex surface radially spaced from said pivot axis by a substantially fixed radius, and an inner concave surface conforming substantially to said outer surface.

2. A stripping and sealing assembly, for a rotary packaging apparatus in which tubular bag material is filled with a product, said stripping and sealing assembly comprising a pair of opposing sealing and stripping means located on opposite sides of said bag material after filling thereof with the product, said sealing and stripping means being constructed to cooperate to sealingly close portions of said bag material and strip same prior to sealing, a first arm means supporting one of said sealing and stripping means and a second arm means supporting the other sealing and stripping means, a pair of generally parallel rotatably driven shafts, from each of which there extends radially outwardly therefrom a respective one of the arm means, each sealing and stripping means including a sealing jaw and a stripper bar, the stripper bars of the first and second arm means cooperating to strip the bag material prior to the jaws sealingly engaging the bag material, and wherein the first and second arm means via said shafts are rotatably driven continuously through complete revolutions in synchronism in opposite directions about spaced parallel stationary axes extending generally transverse of a direction of movement of the bag material so that prior to sealing said bag material the pair of stripping and sealing means are moved along said bag material to cause the stripper bars to strip same, and wherein the assembly further comprises a support for each stripper bar pivotally mounting the stripper bar on its supporting arm means so as to provide for relative movement therebetween about a pivot axis, said assembly further comprising a pair of bag shields, each bag shield being secured to a respective one of the stripper bars and extending angularly therefrom generally along an arc having a radius extending from the pivot axis of the associated support, said shields extending away from each other in opposite directions from their respective stripper bars, when the stripper bars are engaged with the bag material.

3. The stripping and sealing assembly of claim 2, wherein each shield has an arcuate radially outer convex surface having a fixed radius extending from the pivot axis of the associated support, and a radially inner concave surface conforming approximately to the configuration of the radially outer surface so that said shield generally follows an arc having its radius extending from the pivot axis of the associated support.

4. A packaging machine incorporating the stripper bar of claim 1.

5. The stripper member of claim 1, wherein said bag shield is integral with said stripper bar.

6. The stripper member of claim 1, wherein said bag shield extends lengthwise of said stripper bar between said pair of stripper levers.

7. The stripping and sealing assembly of claim 2, wherein each bag shield is integral with its respective stripper bar.

8. The stripping and sealing assembly of claim 2, wherein each bag shield and its respective stripper bar are substantially coextensive in length.

9. The stripping and sealing assembly of claim 8, wherein each bag shield and its respective stripper bar is positioned adjacent to a respective one of said sealing jaws to be located between said one of said sealing jaws and the bag material of a bag being formed.

10. The stripping and sealing assembly of claim 9, wherein each said bag shield extends from its respective stripper bar a distance to cover a top portion of the bag material of the bag being formed.

\* \* \* \* \*